April 28, 1942.   J. L. SIESENNOP   2,280,859
ACCELERATOR AND BRAKE CONTROL
Filed June 21, 1940   2 Sheets-Sheet 1
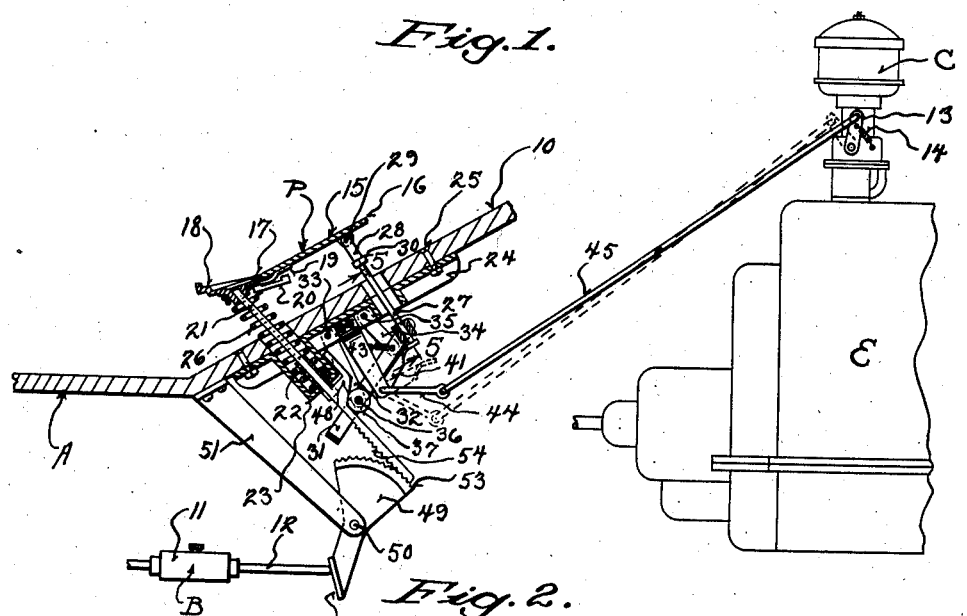
Fig. 1.
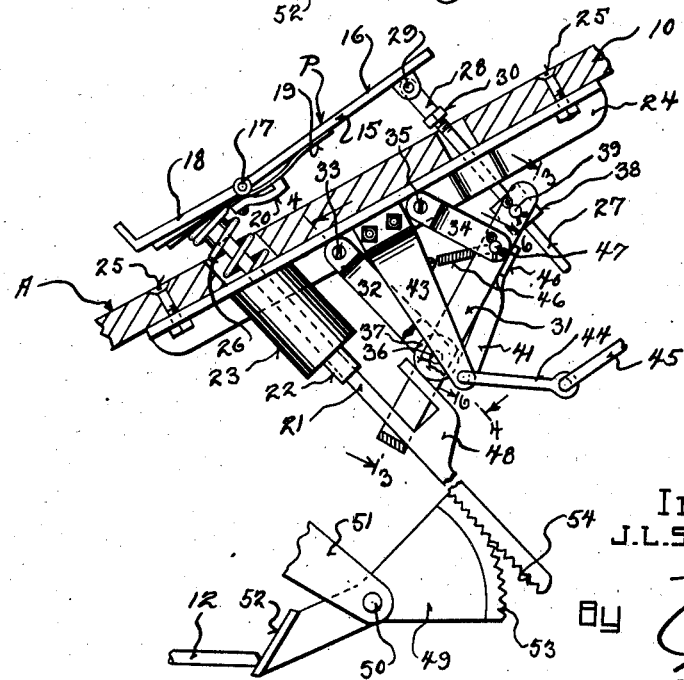
Fig. 2.
Inventor
J. L. Siesennop
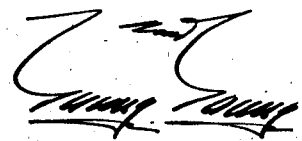
Attorneys April 28, 1942.   J. L. SIESENNOP   2,280,859
ACCELERATOR AND BRAKE CONTROL
Filed June 21, 1940   2 Sheets-Sheet 2
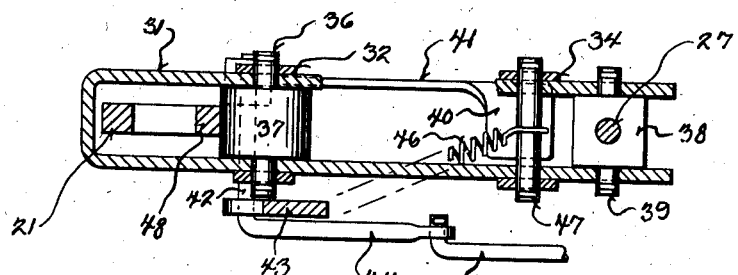
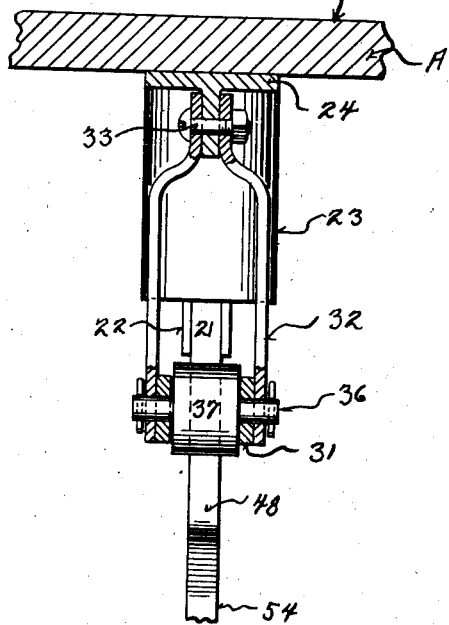
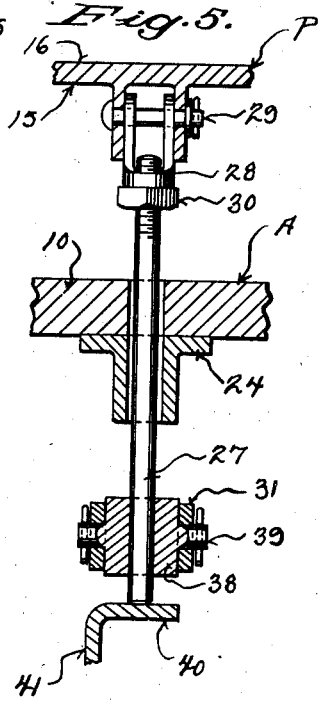
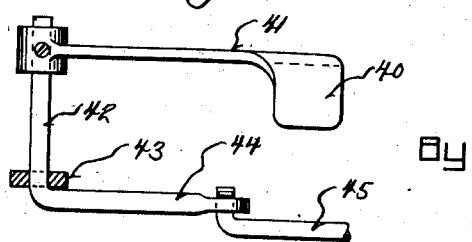
Inventor
J. L. Siesennop
By
Attorneys Patented Apr. 28, 1942

2,280,859

UNITED STATES PATENT OFFICE 2,280,859

ACCELERATOR AND BRAKE CONTROL

John L. Siesennop, Milwaukee, Wis.

Application June 21, 1940, Serial No. 341,603

4 Claims. (Cl. 192—3)

This invention appertains to a single pedal mechanism for controlling the operation of the brakes and accelerator of a motor vehicle, and is an improvement over my pending application Serial No. 329,448, filed April 13, 1940.

One of the salient objects of my present invention is to generally simplify the mechanism for actuating the brakes and accelerator and to prevent undue wear on operating parts, and to insure the smooth and effective functioning of said mechanism under all conditions.

Another important object of my invention is to provide a single pedal control mechanism for the brakes and accelerator of an automobile, which can be easily installed as a unit on the automobile without material change in the brake mechanism and accelerator mechanism now found on automobiles.

A further object of my invention is to provide an improved mechanism for rendering the operating device for the accelerator inoperative when the brakes are applied, so as to effectively prevent the inadvertent operation of said accelerator during the applying of the brakes.

With these and other objects in view, the invention consists in the novel construction, arrangement, and formation of parts, as will be hereinafter more specifically described, claimed, and illustrated in the accompanying drawings, in which drawings:

Figure 1 is a fragmentary, longitudinal, sectional view through an automobile illustrating my improved device for controlling the accelerator and brakes of an automobile, the parts being shown in their normal positions before actuation.

Figure 2 is an enlarged, detail, fragmentary, sectional view illustrating my single pedal control and showing the pedal depressed for applying the brakes, with the accelerator actuating mechanism moved to its inoperative position.

Figure 3 is an enlarged, detail, sectional view taken on the line 3—3 of Figure 2, looking in the direction of the arrows, showing the swinging U-shaped operating frame for moving the accelerator actuating mechanism to an inoperative position during the applying of the brakes.

Figure 4 is a detail, transverse, sectional view taken on the line 4—4 of Figure 2, looking in the direction of the arrows, illustrating the means for rockably mounting the swinging U-shaped frame from the floor boards of an automobile.

Figure 5 is a view similar to Figure 4, but taken on the line 5—5 of Figure 1, looking in the direction of the arrows, and illustrating the actuating means for the throttle valve or accelerator.

Figure 6 is a detail sectional view taken on the line 6—6 of Figure 2, looking in the direction of the arrows, illustrating a part of the accelerator actuating mechanism.

Referring to the drawings in detail, wherein similar reference characters designate corresponding parts throughout the several views, the letter P generally indicates my novel mechanism for bringing about the operation of a carburetor C for an internal combustion engine E and the brake mechanism B of an automobile A.

My novel pedal mechanism P merely discloses one preferred form of my invention, and various changes in details can be made thereto, and it is to be understood that the same can be altered to suit the particular type of brake mechanism and carburetor on different makes of automobiles.

Only a fragment of the automobile A has been shown, and, as illustrated, the automobile includes the footboards 10 arranged in front of the internal combustion engine E. The brake mechanism B is disposed below the floor boards, and the brakes can be considered as of the hydraulic type now commonly used on automobiles on the market. Details of the brake mechanism B are not shown in detail, but, as illustrated, the same include the master cylinder 11 having a piston rod 12 for compressing the fluid in the master cylinder and for forcing such fluid to the individual wheel brake applying structures.

The engine E is of the usual type, and the carburetor C, in the present instance, is of the downdraft character and includes a crank lever 13 for the butterfly or throttle valve of the engine. The throttle valve crank 13 is normally held in an idling position by a coil spring 14. During the speeding up of the engine, the crank 13 is moved to the left (see Figure 3) against the tension of the spring 14.

My novel pedal mechanism P includes the treadle proper 15 having an elongated toe plate 16 hingedly secured, as at 17, to a heel plate 18. The heel plate can be of the same character as that shown in my mentioned pending application, and the toe plate 16 is normally held in a raised position relative to the heel plate by a leaf spring 19. A positive stop 20 is connected with the lower face of the heel plate 18, so as to limit the downward swinging movement of the toe plate 16 relative to said heel plate. The heel plate 18 has rigidly connected thereto the depending brake operating push rod 21, and this push rod extends through a guide sleeve 22 carried by a cup 23 rigidly connected to a supporting base 24. This supporting base 24 is secured to the undersurface of the floor boards 10 in any desired way, such as by the use of bolts 25. An expansion coil spring 26 is placed about the push rod 21 and is confined between the heel plate 18 and the cup 23 for normally holding the heel plate in a raised, elevated position.

The toe plate 16 adjacent its forward end carries a push rod 27 for the accelerator operating mechanism. The accelerator push rod 27 is threaded into a socket 28 hingedly connected, as at 29, to the lower face of the toe plate 16. A lock nut 30 holds the accelerator push rod 27 in a preferred adjusted position.

Arranged below the supporting base 24 is a swinging U-shaped operating frame 31. This frame is supported adjacent its rear end by swinging links 32, which are pivotally connected, as at 33, to a supporting base 24. The front of the U-shaped frame is supported by swinging links 34, which are pivotally connected to the base 24 by means of a pivot pin 35. The bolt 36 employed for pivotally connecting the swinging links 32 with the frame 31 also rotatably supports the anti-friction roller 37, the purpose of which will be later set forth.

Rockably carried by the extreme forward end of the frame 31 is a guide block 38, and this guide block 38 slidably receives the accelerator push rod 27. By referring to Figure 3, it will be noted that the guide block 38 carries outwardly extending pintles 39, which are rotatably mounted in bearing openings formed in the side walls or legs of the U-shaped frame 31.

The accelerator push rod 27 extends through and below the guide block 38 and is adapted to engage a laterally extending foot 40 formed on a lever 41. This lever 41 is rigidly secured to a crankshaft 42, which is rotatably mounted in a hanger bracket 43 depending from the base 24. The crankshaft 42 has formed thereon or otherwise secured thereto a crankarm 44, and the forward end of the crankarm has, in turn, pivotally connected thereto the pull rod 45. This pull rod 45 extends toward the carburetor C and is pivotally connected to the outer end of the throttle or accelerator valve lever 13.

From the description so far, it can be seen that when a downward push is exerted on the toe plate 16, a downward thrust will be exerted on the accelerator push rod 27, and as this push rod normally engages the foot 40, the lever 41 will be actuated, causing corresponding movement of the crank shaft 42. This will pull back on the pull rod 45 and open the throttle or accelerator valve of the carburetor. A relatively heavy contractile coil spring 46 is connected to a pivot bolt 47 employed for pivotally connecting the links 34 with the swinging frame 31 and to the hanger bracket 43. The coil spring 46 functions to hold the frame 31 back toward the brake push rod 21, and the front of the frame 31 in a raised position. The push rod 21 has formed thereon a cam track 48, which is adapted to engage the anti-friction roller 37 carried by the frame 31.

Any preferred means can be employed for operatively connecting the push rod 21 with the brake plunger 12, and, as illustrated in the drawings, a lever 41 can be provided, and this lever can be rockably mounted intermediate its ends on a pin 50 carried by a bracket 51 secured to the floor boards 10 of the automobile. The rear end of the lever 49 has formed therein a foot 52 for engaging the brake plunger rod 12, and the forward end of the lever 49 has formed thereon a sector gear or pinion 53, the teeth of which mesh with the teeth of a rack bar 54 formed on the push rod 21.

Upon downward thrust on the heel plate 18, the rack bar 54 will cause movement of the double-ended lever 49, and this lever will push against the brake plunger rod 12, causing the applying of the brakes.

Upon initial downward movement of the brake push rod 21, the cam track 48 will engage the anti-friction roller 37, and cause forward movement of the swinging frame 31 against the tension of the coil spring 46. This movement will cause the carrying of the accelerator push rod 27 off the foot 40 of the accelerator lever 41, and, consequently, operation of the throttle valve will be prevented during the applying of the brakes. After the initial movement of the heel plate 18, the entire pedal can be depressed without causing the actuation of the throttle valve.

From the foregoing description it can be seen that I have provided an exceptionally simple and durable mechanism for bringing about the operation of the brakes and throttle valve from a single foot pedal mechanism.

Changes in details may be made without departing from the spirit or the scope of this invention, but what I claim as new is:

1. The combination with an automobile having a brake mechanism and an engine having a carburetor provided with a throttle valve and an operating crank: a treadle mechanism including a hingedly connected heel and toe plate, means for actuating the brake mechanism from the heel plate, including a push rod, a swinging frame, means for operating the throttle valve from the toe plate, including an accelerator push rod pivotally connected to the toe plate, and a swinging crank lever disposed below the accelerator push rod, a guide on the swinging frame for the accelerator push rod, a cam track on the brake push rod, a roller on the swinging frame, and resilient means normally holding the forward end of the frame in a raised position with the frame back toward the brake push rod, and the accelerator push rod on said lever, and the roller against the brake push rod, whereby upon downward movement of the brake push rod, the cam track will force the roller and swinging frame forward and the accelerator push rod off the lever.

2. The combination with an automobile having a brake mechanism, an engine including a carburetor provided with a throttle valve and a swinging frame for operating the same: a treadle mechanism including a hingedly connected heel and toe plate, means for actuating the brake mechanism from the heel plate, including a brake push rod, a cam track formed on the push rod intermediate its ends, means for actuating the crank of the throttle valve from the toe plate, including an accelerator push rod pivotally secured to the toe plate adjacent its forward end, and a swinging lever having operative connection with the crank of the throttle valve, a swinging frame, front and rear pairs of links pivotally supporting the swinging frame, a guide block rockably carried by the forward end of the swinging frame slidably receiving the pivoted accelerator push rod for normally holding the push rod on and in engagement with the operating lever, and a contractile coil spring connected with the swinging frame normally holding the swinging frame in a raised position with the anti-friction roller against the brake push rod and cam track, as and for the purpose specified.

3. The combination with an automobile having a brake mechanism, and an engine provided with a carburetor, and including a throttle valve having an operating crank: a treadle mechanism including a hingedly connected heel and toe plate, means for actuating the brake mechanism from the heel plate, including a brake push rod secured to the heel plate and depending therefrom, a cam track on said push rod, and means for operating the crank for the throttle valve from the toe plate, including an accelerator push rod pivotally secured to the toe plate adjacent the forward end thereof, a crank shaft, a crankarm on the shaft operatively connected to the throttle crank, and a lever on said crankshaft having a foot normally disposed under the accelerator push rod, a swinging frame, front and rear pairs of links pivotally supporting the frame, a guide block rockably carried by the forward end of the swinging frame slidably receiving the accelerator push rod, an anti-friction roller on the frame engaging the brake push rod and its guide track, and spring means connected with the frame normally holding the forward end of the frame in a raised position, and the frame back, with the anti-friction roller in engagement with the push rod, and the accelerator push rod above and in engagement with the foot of the lever.

4. The combination with an automobile having a brake mechanism, and an engine provided with a carburetor including a throttle valve and a swinging crank for operating the same: a single treadle means for actuating the brake mechanism and carburetor, including a hingedly connected heel and toe plate, means for operating the brake mechanism from the heel plate, including a brake push rod, a rack bar on said push rod, means for actuating the throttle valve from the toe plate, including an accelerator push rod pivotally connected with said toe plate, and a swinging lever operatively connected to the throttle valve crank, the accelerator push rod normally engaging the outer end of the swinging lever, means for moving the accelerator push rod off said lever upon downward movement of the brake push rod, a double-ended brake operating lever, and a sector gear on said double-ended brake operating lever meshing with the rack bar of the brake push lever.

JOHN L. SIESENNOP.